(12) United States Patent
Wu et al.

(10) Patent No.: US 11,988,454 B2
(45) Date of Patent: May 21, 2024

(54) COMPACT MEMBRANE-BASED THERMOCHEMICAL ENERGY STORAGE SYSTEM

(71) Applicant: City University of Hong Kong, Hong Kong (HK)

(72) Inventors: Wei Wu, Hong Kong (HK); Zhixiong Ding, Hong Kong (HK); Yunren Sui, Hong Kong (HK); Chong Zhai, Hong Kong (HK); Zengguang Sui, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 129 days.

(21) Appl. No.: 17/458,599

(22) Filed: Aug. 27, 2021

(65) Prior Publication Data
US 2023/0075850 A1    Mar. 9, 2023

(51) Int. Cl.
*F28D 20/00* (2006.01)
*F01K 3/18* (2006.01)

(52) U.S. Cl.
CPC ............ *F28D 20/003* (2013.01); *F01K 3/188* (2013.01)

(58) Field of Classification Search
CPC ........ F28D 20/003; F25B 15/00; F25B 37/00; F25B 30/04; F25B 15/025; F25B 15/04; F25B 15/06; F24F 5/0014; F24F 2203/026
See application file for complete search history.

(56) References Cited

U.S. PATENT DOCUMENTS 10,443,954 B1 * 10/2019 Zidan .................... F28D 20/003
10,648,712 B1 *  5/2020 Dev ........................ F25B 15/02
(Continued)

FOREIGN PATENT DOCUMENTS

CN    109099611 A  * 12/2018  .............. F25B 15/06
CN    110207522 A  *  9/2019  ........... F28D 20/003
(Continued)

OTHER PUBLICATIONS

DE-102016205120-A1 (Year: 2017).*
(Continued)

*Primary Examiner* — Jenna M Maroney
(74) *Attorney, Agent, or Firm* — Idea Intellectual Limited; Margaret A. Burke; Sam T. Yip (57) ABSTRACT

A thermochemical energy storage system. The system includes a membrane-based thermochemical reactor having a solution channel having an absorbent-containing solution flowing therethrough and a refrigerant channel having a refrigerant flowing therethrough along with first and second fluid channels. A porous membrane is positioned between the refrigerant channel and the solution channel; the porous membrane permits flow of vapor molecules therethrough while restricting flow of absorbent molecules. The system further includes a solution storage repository in fluid communication with the solution channel and a refrigerant repository in fluid communication with the refrigerant channel. The system can be used in high-density, high-efficiency, and low-temperature energy storage systems. The membrane-based reactor offers a large specific surface area and integrates solution/refrigerant flows, which enables formation of a highly compact reactor exhibiting strong heat/mass transfer. In some embodiments, direct diffusion of water molecules through the membrane makes it possible to lower the required charging temperatures.

14 Claims, 10 Drawing Sheets

(56) References Cited

U.S. PATENT DOCUMENTS

| | | | | |
|---|---|---|---|---|
| 2014/0298822 | A1* | 10/2014 | Ma | F28D 20/003 60/39.12 |
| 2015/0266144 | A1* | 9/2015 | Bengaouer | F28D 20/021 165/10 |
| 2016/0305693 | A1* | 10/2016 | Moghaddam | F25B 17/02 |
| 2017/0241718 | A1* | 8/2017 | Iwata | F28D 20/025 |
| 2017/0284707 | A1* | 10/2017 | Brenner | F25B 15/06 |
| 2019/0184334 | A1* | 6/2019 | Moghaddam | F25B 15/02 |
| 2019/0331435 | A1* | 10/2019 | Masuda | F28D 17/023 |
| 2023/0069597 | A1* | 3/2023 | Wu | F25B 15/002 |
| 2023/0075850 | A1* | 3/2023 | Wu | F24F 5/0017 |

FOREIGN PATENT DOCUMENTS

| | | | | |
|---|---|---|---|---|
| CN | 110332837 A | * | 10/2019 | F01K 27/00 |
| CN | 110382989 A | * | 10/2019 | C04B 28/00 |
| EP | 1543753 A2 | * | 6/2005 | A47J 39/006 |
| EP | 3527919 A1 | * | 8/2019 | C09K 5/066 |
| EP | 3869124 A1 | * | 8/2021 | |
| FR | 2996630 A1 | * | 4/2014 | B23P 15/26 |
| FR | 3107587 A1 | * | 8/2021 | C09K 5/16 |
| GB | 2088548 A | * | 6/1982 | F24D 11/02 |
| JP | 05223478 A | * | 8/1993 | |
| JP | 2016176612 A | * | 10/2016 | F28D 20/003 |
| KR | 2017125184 A | * | 11/2017 | B01J 20/103 |
| KR | 102292157 B1 | * | 8/2021 | |
| WO | WO-2017203088 A1 | * | 10/2017 | F02G 5/02 |

OTHER PUBLICATIONS

Zengguang Sui et al., "Swirling flow for performance improvement of a microchannel membrane-based absorber with discrete inclined grooves", International Journal of Refrigeration, 2021.

Zengguang Sui et al., "Performance investigation and enhancement of membrane-contactor microchannel absorber towards compact absorption cooling", International Journal of Heat and Mass Transfer, Jan. 10, 2021.

* cited by examiner

COMPACT MEMBRANE-BASED THERMOCHEMICAL ENERGY STORAGE SYSTEM

FIELD OF THE INVENTION

The present invention relates generally to the field of energy storage systems. More particularly, the invention relates to devices, systems, subsystems, components and methods that facilitate the collection, storage and transfer of heat and other types of energy.

BACKGROUND

Building energy consumption typically accounts for 20-40% of the total energy consumption in many countries and regions. Within the category of building energy consumption, heating, ventilating, and air-conditioning (HVAC) generally accounts for the largest proportion. Energy saving and emission mitigation by utilizing renewable energy and waste heat in HVAC have been widely encouraged.

Cooling, heating, and dehumidification by renewable/waste energy are promising for building energy usage reduction and emission mitigation. However, the intermittent nature of renewable/waste energy results in inefficient and under-utilization of these energy sources.

Thermal energy storage is able to play a significant role in balancing the energy supply and energy demand. Thermal energy storage may be considered as temporarily maintaining thermal energy in the form of hot or cold substances, phase changes of phase change materials, or chemical reactions. By reversing the energy storage (for example changing phase from liquid to solid), the stored energy is released at a later time for use. Thermal energy storage can increase the efficiency of building energy systems by storing energy between the time when thermal energy is produced and the time when the stored energy can be used by the building. For example, a peak load demand can be shifted to off-peak hours by utilizing stored heat energy from a thermal energy storage unit.

There are three types of thermal energy storage systems:
Sensible: heat transfer to store and release heat via temperature change
Latent: for example, phase change materials using the latent heat of fusion
Chemical: for example, absorption/desorption and thermochemical (a reversible chemical reaction that absorbs thermal energy and releases thermal energy).

Absorption-based thermochemical energy storage outperforms the conventional sensible and latent thermal energy storage owing to its excellent energy storage density, energy storage efficiency, flexibility (cooling/heating/dehumidification), and charging temperature. However, for existing absorption-based thermochemical energy storage systems, there are two major issues to be addressed for wider applications: reducing reactor size to improve energy storage density, and lowering the charging temperature to utilize low-grade thermal energy that otherwise is unusable. The widely-used immersed and falling-film reactors have limited absorption rates and separated solution/refrigerant flows, which significantly constrain the energy storage performance.

Therefore, there is a growing need to develop novel reactors to maximize energy density, lower the charging temperature, increase energy efficiency, and reduce capital cost.

SUMMARY OF THE INVENTION

The present invention presents a novel thermochemical energy storage system using a microchannel membrane-based reactor; the reactor can be used in high-density, high-efficiency, and low-temperature energy storage systems. The microchannel membrane-based reactor offers a large specific surface area and integrates solution/refrigerant flows, which enables formation of a highly compact reactor exhibiting strong heat/mass transfer. In some embodiments, direct diffusion of water molecules through the membrane makes it possible to lower the required charging temperatures.

In one embodiment, the present invention presents a thermochemical energy storage system. The system includes a membrane-based thermochemical reactor. The reactor includes a solution channel having an absorbent-containing solution flowing therethrough and a refrigerant channel with a refrigerant flowing therethrough along with first and second fluid channels. A porous membrane is positioned between the refrigerant channel and the solution channel; the porous membrane permits flow of vapor molecules therethrough while restricting flow of absorbent molecules. The system further includes a solution storage repository in fluid communication with the solution channel and a refrigerant repository in fluid communication with the refrigerant channel.

In a further embodiment, the present invention provides a thermochemical energy storage system that includes a membrane-based thermochemical reactor having a solution channel having an absorbent-containing solution flowing therethrough and a refrigerant channel having a refrigerant flowing therethrough. A vapor channel is positioned between the solution channel and the refrigerant channel. The reactor further includes a first fluid channel having a heat source/heat sink fluid flowing therethrough and a second fluid channel having a heat source/heat sink transfer fluid flowing therethrough. A first porous membrane is positioned between the refrigerant channel and the vapor channel. A second porous membrane is positioned between the vapor channel and the solution channel. The porous membrane permits flow of vapor molecules therethrough while restricting flow of absorbent molecules. A solution storage repository stores the absorbent-containing solution and is in fluid communication with the solution channel. Similarly, a refrigerant repository stores the refrigerant and is in fluid communication with the refrigerant channel.

DETAILED DESCRIPTION

In one aspect, the present invention may use a reversible physical/chemical process in which a gas is exothermically absorbed and endothermically desorbed on an absorbent medium (which may be a liquid or solid). For example, an absorption/desorption between a gas such as water vapor ($H_2O$), ammonia ($NH_3$) vapor, alcohol, hydrofluorocarbon (HFC), hydrofluoroolefin (HFO), or $CO_2$ and a reagent such as salt, water, ionic liquid, or other absorbents. The charging and discharging processes are represented by the equation below (diluted solution means a lower fraction of absorbent; concentrated solution means a higher fraction of absorbent):

In the charging process, the diluted solution is heated by thermal energy and becomes a concentrated solution after some refrigerant is generated (desorption); the thermal energy is stored in the concentrated solution. In the discharging process, the concentrated solution is mixed with the refrigerant (absorption) and becomes a diluted solution. The heat release is the useful output if the purpose is heating supply, while the cooling effect caused by the refrigerant evaporation is the useful output if the purpose is cooling supply.

Figure 1:
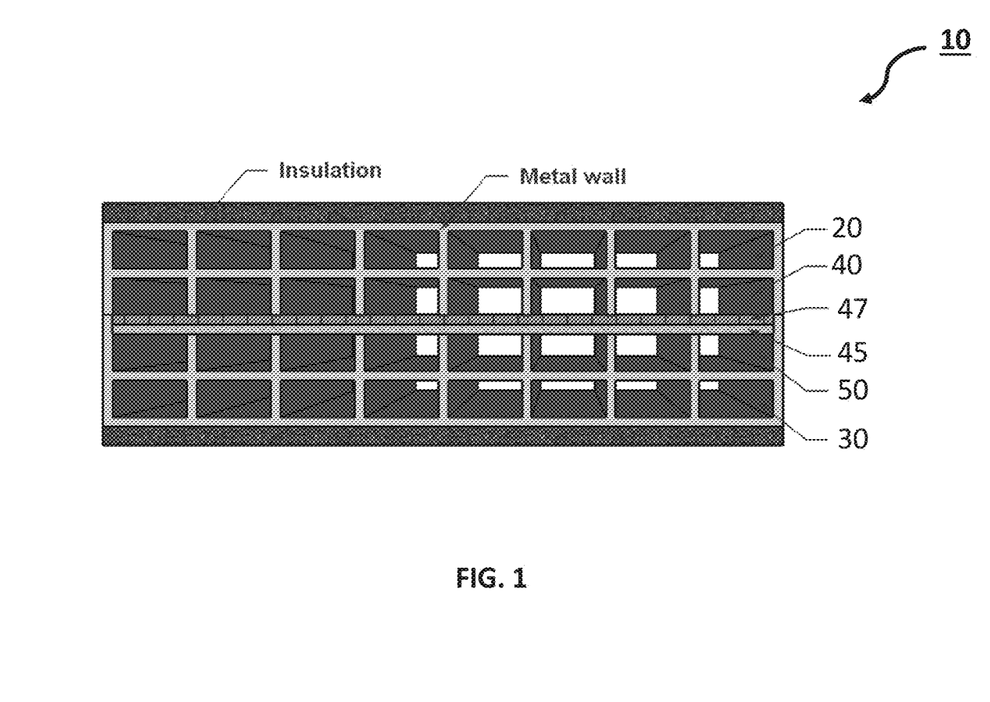
FIG. 1 depicts a membrane-based reactor according to an embodiment.

$H_2O$-based solutions (e.g., $H_2O$/LiBr, $H_2O$/LiCl) and $NH_3$-based solutions (e.g., $NH_3/H_2O$, $NH_3/LiNO_3$) are widely used absorption working fluids. The energy storage mechanism of $H_2O$-based solutions can be represented by the equation below:

The energy storage mechanism of $NH_3$-based solutions can be represented by the equation below:

FIG. 1 depicts a membrane-based reactor 10 for thermochemical energy storage according to one embodiment of the present invention. The reactor 10 includes plural channels for solution (refrigerant/absorbent mixture), refrigerant, and heat source/sink liquids. The heat source/sink liquids, which may be hot water, conduction oil, cooling water, chilled water, antifreeze, etc. depending on the role of the fluid in different operation modes, flow through liquid channel 20 and liquid channel 30, respectively. The refrigerant channel 40 is positioned adjacent to the solution channel 50 and is separated by a porous membrane 45 and optional hollow membrane support plate 47. Note that the depiction of the reactor 10 is schematic only; the cross-sections of the various channels may be arbitrarily selected to be square, rectangular, circular, curved, and other selected shapes.

The membrane 45 used in the membrane-based reactor 10 is a porous membrane that acts as a semi-barrier, allowing small-sized molecules (e.g., vaporized refrigerant) to pass through the membrane, while restricting larger-sized molecules (e.g., absorbent molecules) from passing through the membrane. Owing to the large specific surface area (interfacial area per unit volume) of the membrane, the membrane-based reactor provides a high-performance absorption/desorption process in a small volume, which is beneficial to the energy storage performance enhancement. Furthermore, the microchannels having a high specific surface area can be integrated with the membrane to obtain a highly-compact and highly-efficient energy storage reactor. In one embodiment, the membrane may have a pore diameter in a range from approximately 0.2 to 6 microns with a thickness in a range from approximately 20 to approximately 175 microns; porosity ranges from approximately 0.4 to 0.85. The porous membrane is selected from polyethylene (PE), polypropylene (PP), polytetrafluoroethylene (PTFE), polyvinylidene fluoride (PVDF), their composites, and other porous materials.

Figure 2:
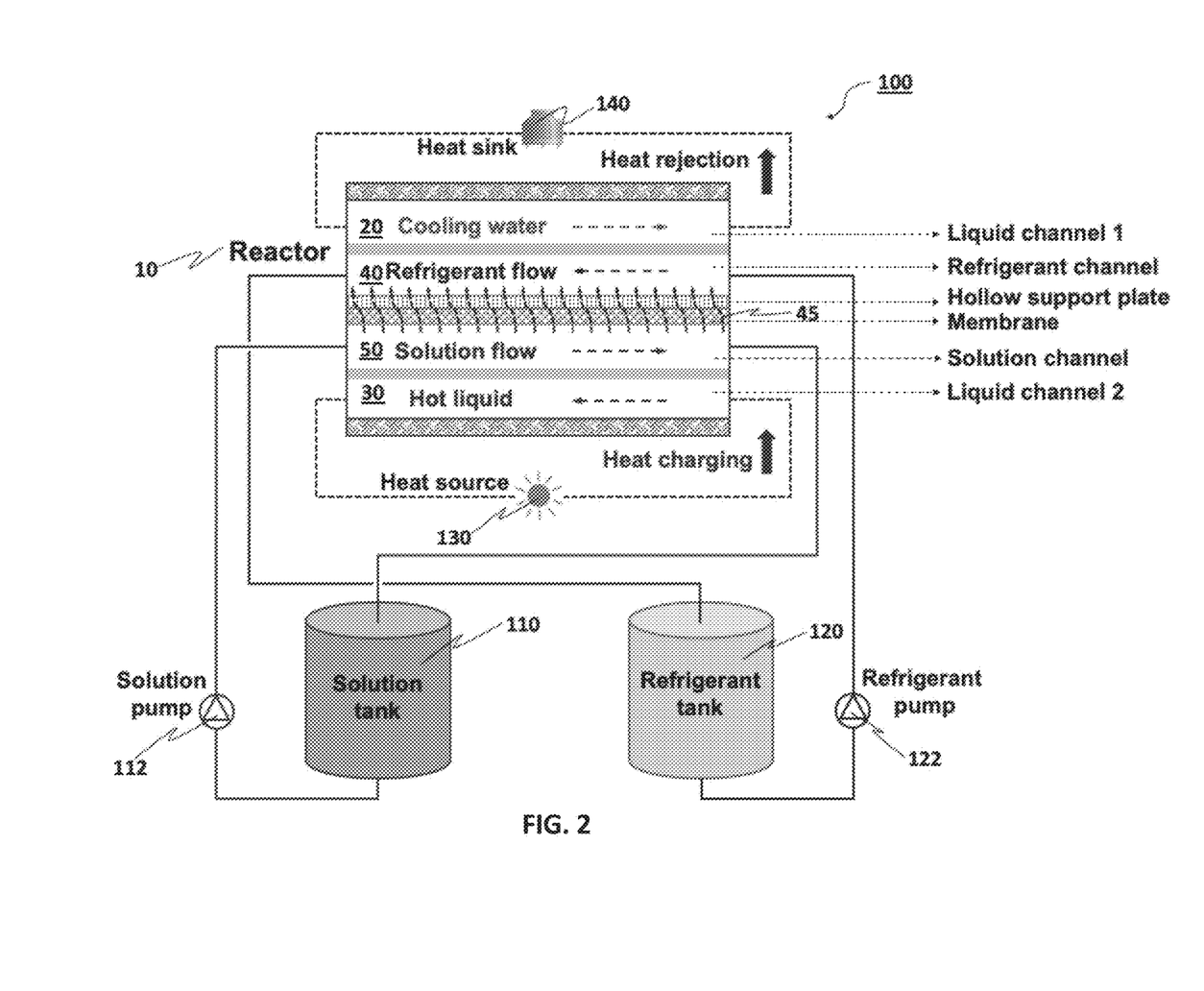
FIG. 2 depicts a thermal energy storage system incorporating the membrane-based reactor of FIG. 1.

FIG. 2 depicts a thermochemical energy storage system 100 that includes the membrane-based thermochemical reactor 10 of FIG. 1. As seen in FIG. 2, a solution tank 110 acts as a receptacle for the solution (refrigerant/absorbent mixture) while a refrigerant tank 120 acts as a receptacle for the refrigerant. A solution pump 112 may be used to circulate the refrigerant/absorbent solution and a refrigerant pump 122 may be used to circulate the refrigerant.

A charging process of the system is depicted in FIG. 2. A diluted solution in the solution tank 110 is pumped via pump 112 into the solution channel 50 of the reactor 10. A heat source (e.g., solar energy or waste energy) 130 generates heat that heats the liquid (e.g., water) in the liquid channel 30. Thermally driven by the heated liquid produced from the heat source, the diluted solution generates vaporized refrigerant whilst flowing inside the solution channel 50. The vaporized refrigerant passes through the porous membrane 45 and enters the refrigerant channel 40. Cooled by the cooling water produced from heat sink 140 (e.g., a cooling tower or evaporative cooler), the vaporized refrigerant is condensed into liquid refrigerant in the refrigerant channel 40 and then flows into the refrigerant tank 120. The diluted solution becomes concentrated after the vapor generation process and flows back to the solution tank 110. As the solution becomes increasingly concentrated, the thermal energy is stored in the form of thermochemical energy via the solution concentration glide in the solution tank 110.

With its selectivity characteristic, the porous membrane 45 separates the feed solution into a retentate (concentrated solution) and a permeate (refrigerant) by controlling the movement of molecules across the membrane. Vaporized refrigerant is separated from the solution due to the vapor refrigerant pressure difference even at low driving temperatures. Thus, the desorption (generation) process occurs before the solution is heated to the boiling point, making it possible to apply low-grade energy in the membrane-based thermochemical energy storage system. These low-grade energy sources are typically unusable in conventional systems, resulting in wasted energy.

Note that all the figures only depict one module of the membrane-based reactor, more reactor modules can be combined in series or in parallel to enlarge the energy storage capacity.

Figure 3:
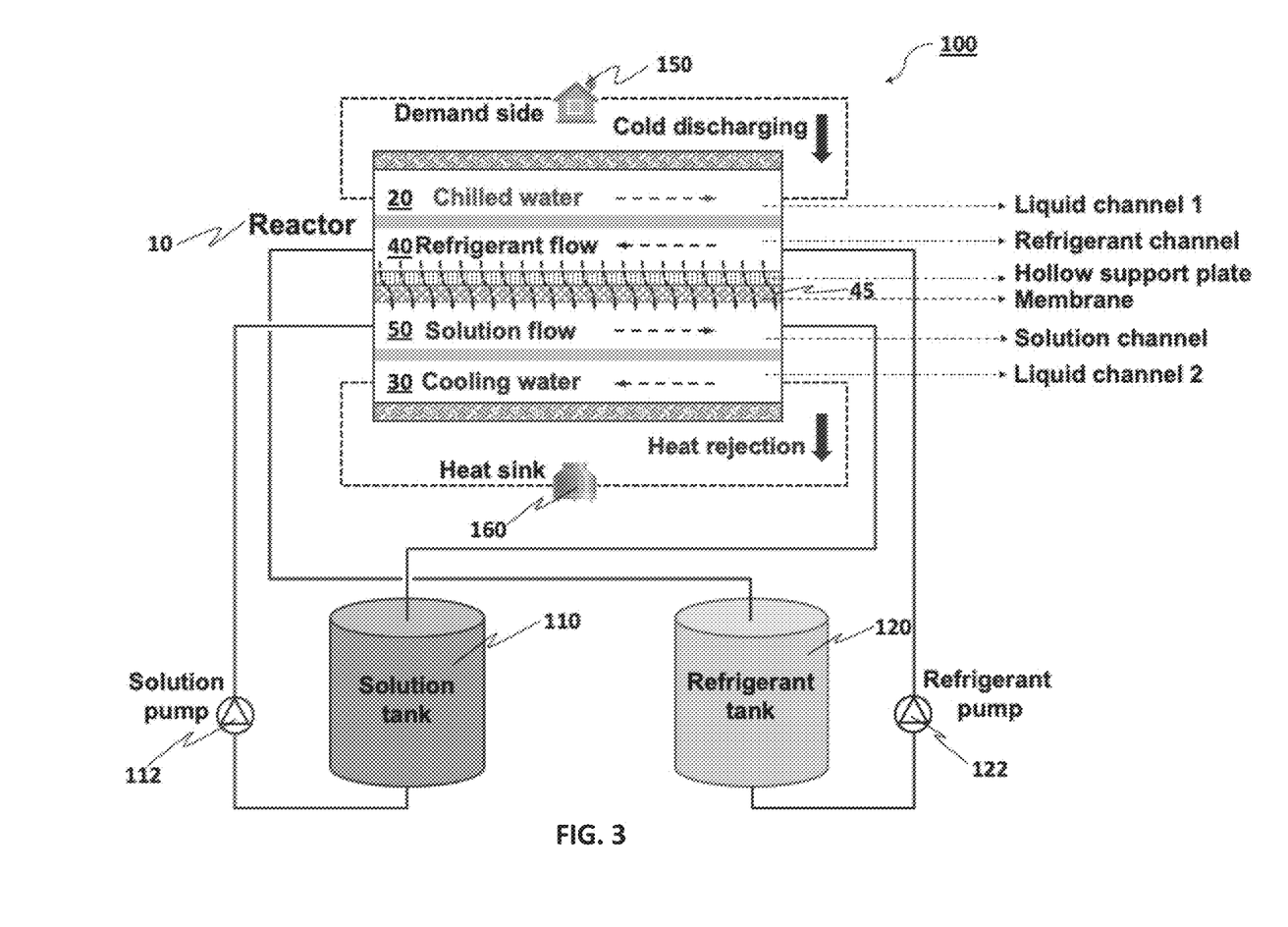
FIG. 3 depicts a cold discharge process using the thermal energy storage system of FIG. 2.

The stored energy can be discharged and used for cooling and heating. The cold discharging process of the system 100 is shown in FIG. 3. The concentrated solution in the solution tank 110 is pumped into the solution channel 50 of the reactor 10 by the solution pump 112. Cooled by the cooling water produced from heat sink 160, the saturated partial vapor pressure decreases inside the solution channel 50. The liquid refrigerant in the refrigerant tank 120 is pumped into the refrigerant channel of the reactor by the refrigerant pump 122. Extracting low-grade heat from the chilled water in liquid channel 20, the liquid refrigerant evaporates and becomes vaporized refrigerant, which then passes through the membrane 45 and gets absorbed by the concentrated solution in the solution channel 50. The concentrated solution becomes diluted after the vapor absorption process and flows back to the solution tank 110. As the solution becomes increasingly diluted, the thermochemical energy is discharged for cooling the demand side 150 via the evaporation effect in liquid channel 20.

Figure 4:
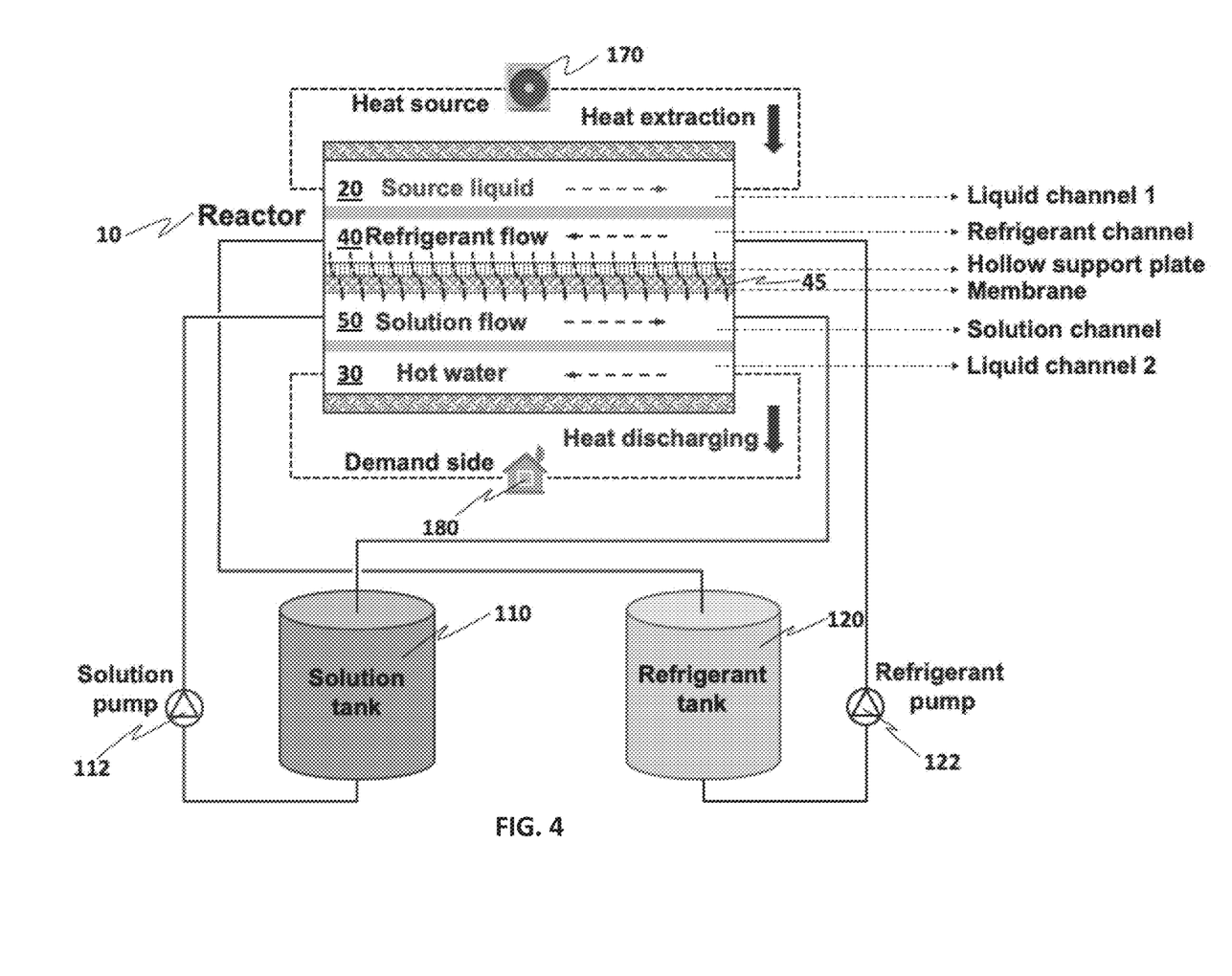
FIG. 4 depicts a heat discharge process using the thermal energy storage system of FIG. 2.

The heat discharging process of the system is shown in FIG. 4. The heat/mass transfer process is similar to that of the cold discharging process, except that the evaporation process extracts low-grade heat from the source liquid in liquid channel 20; the source liquid is heated by heat source 170. The thermochemical energy is discharged for heating to the heat demand side 180 via the absorption effect in liquid channel 30.

The membrane 45 pores are filled with vaporized refrigerant evaporated from the refrigerant channel 40 while the solution is constrained inside the narrow solution flow channel 50 by the membrane 45 due to its selective permeation characteristics. The feed solution flows inside the solution channel 50, and the vaporized refrigerant is driven to the feed solution for absorption by the partial vapor pressure difference. Apart from enhanced heat/mass transfer, this reactor geometry also makes the energy storage system more resistant to mechanical shock and less sensitive to orientation.

The solution (refrigerant/absorbent mixture) of the energy storage system can be various, including $H_2O$-based solutions, $NH_3$-based solutions, alcohol-based solutions, hydrofluorocarbon (HFC)-based solutions, hydrofluoroolefin (HFO)-based solutions, $CO_2$-based solutions, and other solutions. In these solutions, the absorbent can be salt, hydroxide, water, ionic liquid, or other inorganic/organic absorbents. In addition, the refrigerant can be pure refrigerant or blend refrigerant, and the absorbent can be pure absorbent or blend absorbent.

Figure 5:
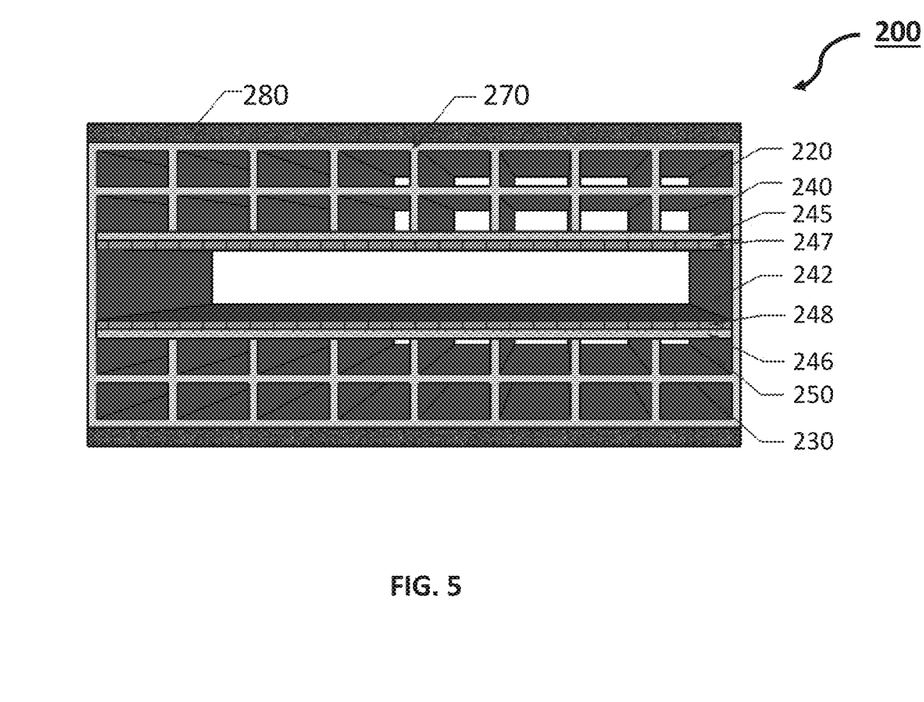
FIG. 5 depicts a membrane-based reactor according to a further embodiment.

Another embodiment of a membrane-based reactor is shown in FIG. 5. The FIG. 5 reactor 200 includes at least five channels, a solution channel 250, a refrigerant channel 240, two fluid channels 220 and 230, and a vapor channel 242. The additional vapor channel 242 can eliminate heat conduction between the solution channel 250 and the refrigerant channel 240, avoiding heat interference with each other. Accordingly, two layers of membrane 245, 246 and two layers of hollow support plate 247, 248 are used. The solution channel 250, refrigerant channel 240, and fluid channels 220 and 230 may be divided into multiple sub-channels by wall 270.

Figure 6:
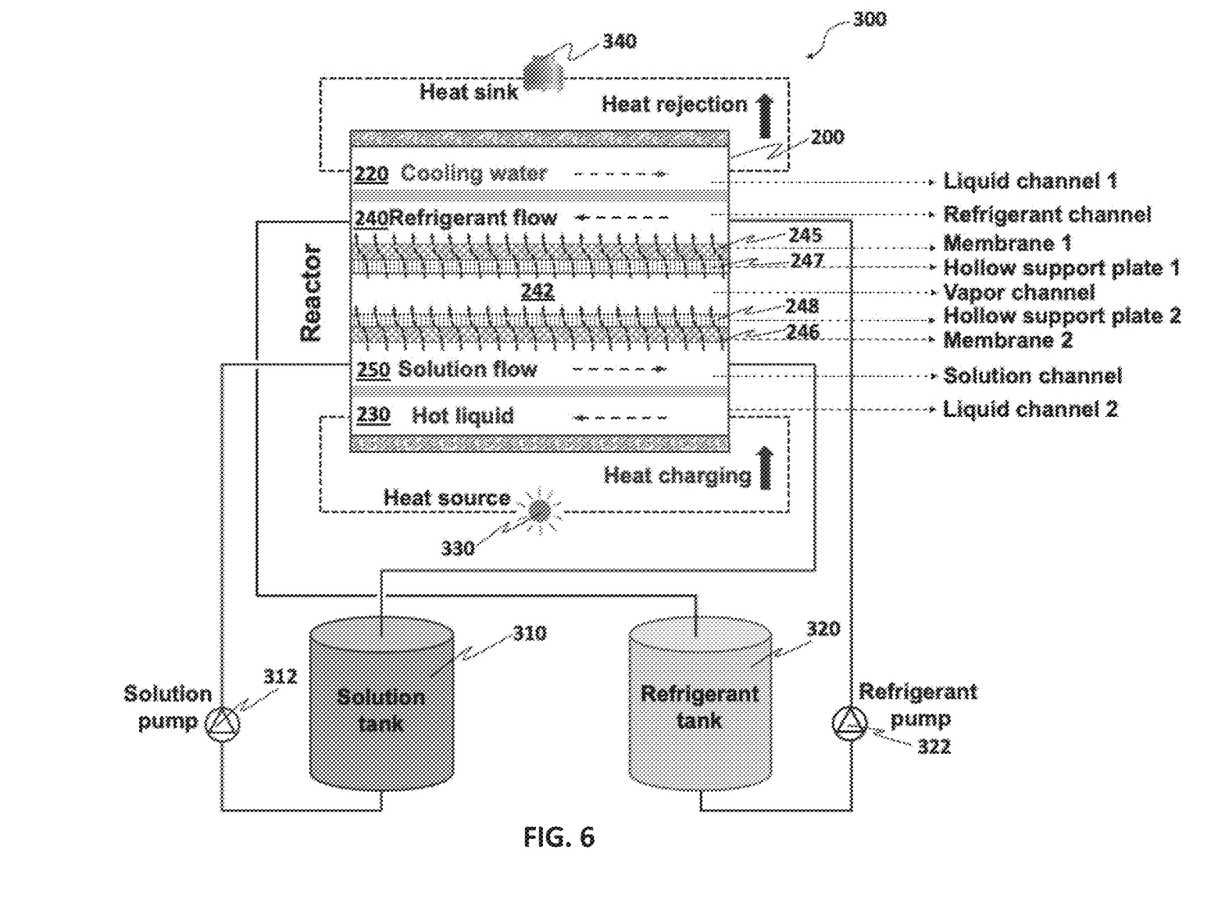
FIG. 6 depicts a thermal energy storage system incorporating the membrane-based reactor of FIG. 5 during a charging process.

FIG. 6 depicts a thermochemical energy storage system 300 that includes the membrane-based thermochemical reactor with a vapor channel 200 of FIG. 5. The charging process of the modified system is shown in FIG. 6. The operation process is similar to that of the system shown in FIG. 2; the difference is that the vaporized refrigerant generated from the solution channel 250 initially passes through membrane 246 to enter the vapor channel 242, and then passes through membrane 245 to enter the refrigerant channel 240, and finally gets condensed in the refrigerant channel 240. The system of FIG. 6 includes heat source 330, heat sink 340, solution pump 312, refrigerant pump 322, solution tank 310, and refrigerant tank 320.

Figure 7:
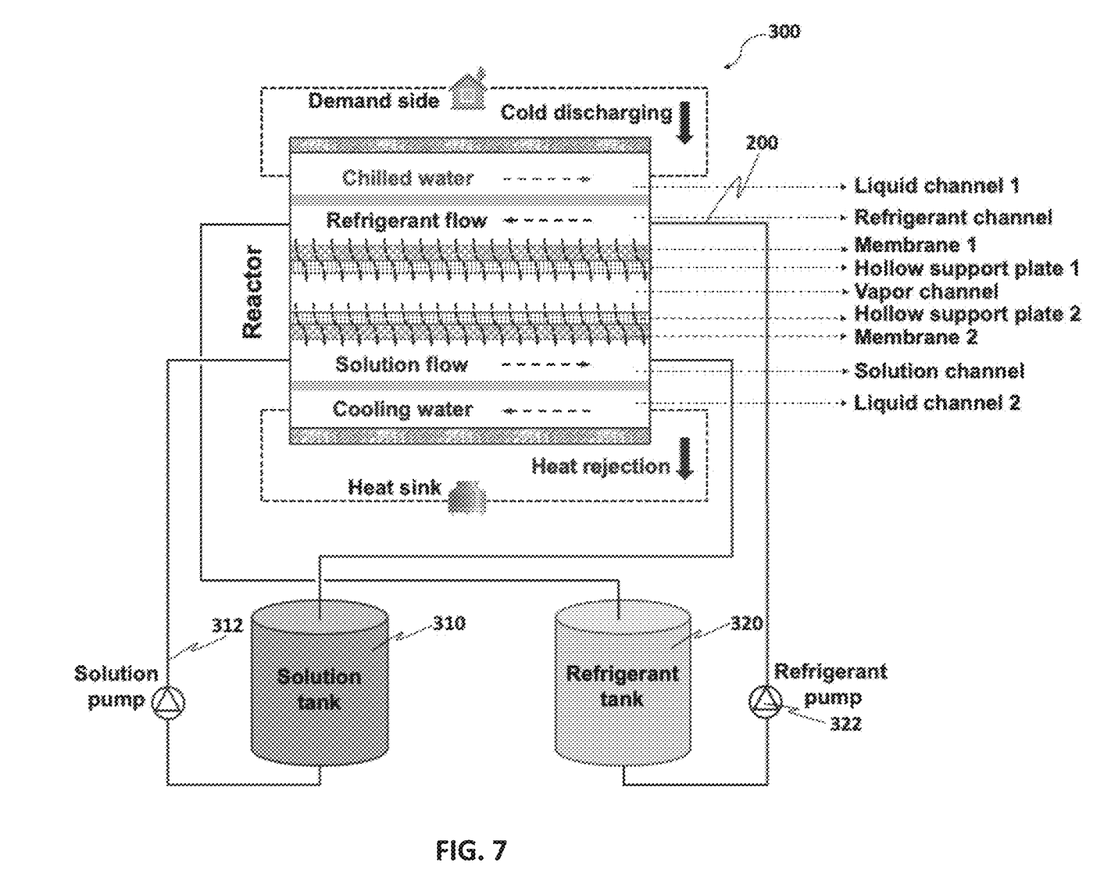
FIG. 7 depicts a thermal energy storage system incorporating the membrane-based reactor of FIG. 5 during a cold discharging process.
Figure 8:
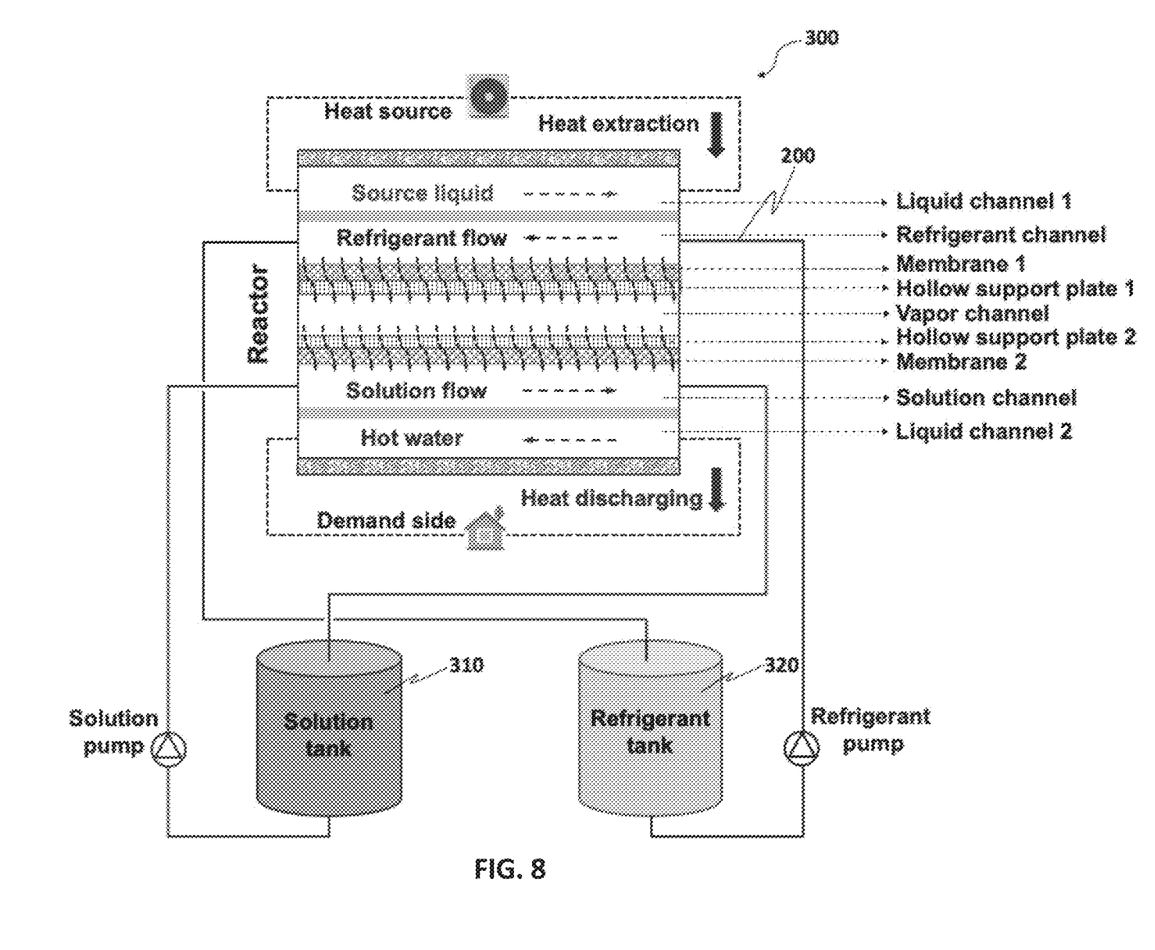
FIG. 8 depicts a thermal energy storage system incorporating the membrane-based reactor of FIG. 5 during a heat discharging process.

The cold discharging and heat discharging processes of the 5-channel reactor-based system 300 are respectively shown in FIG. 7 and FIG. 8. The operation processes are substantially similar to those shown in FIG. 3 and FIG. 4; the difference is that the vaporized refrigerant evaporated from the refrigerant channel 240 initially passes through membrane 245 to enter the vapor channel 242, and then passes through membrane 246 to enter the solution channel 250, and finally gets absorbed in the solution channel 250.

Figure 9:
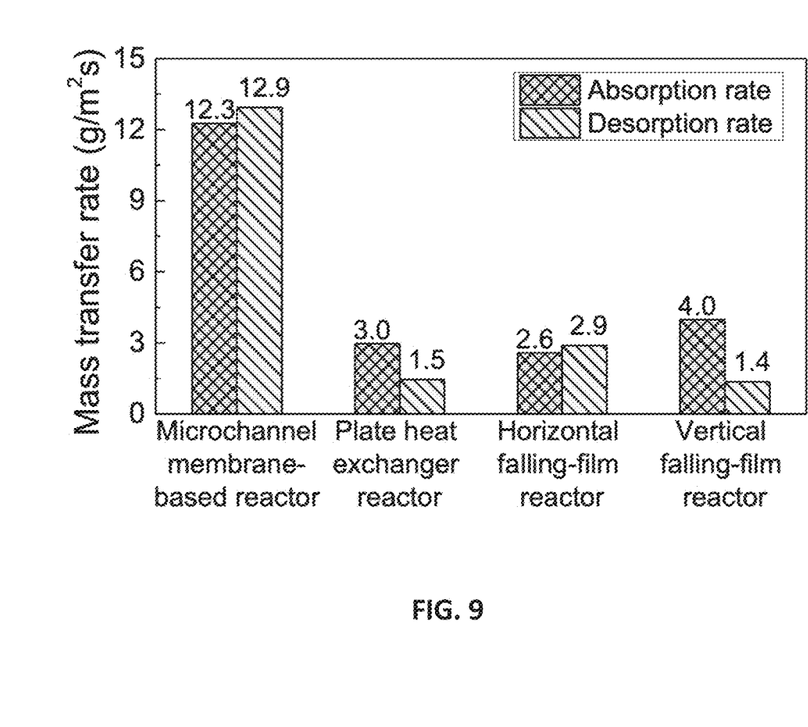
FIG. 9 shows comparisons of absorption/desorption rates for the membrane-based reactors of the present invention compared to prior art reactors.
Figure 10:
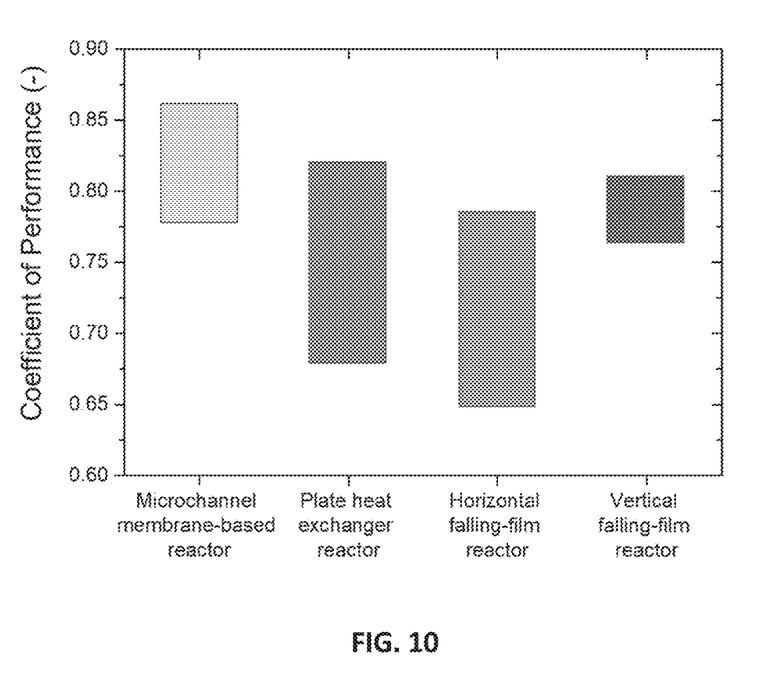
FIG. 10 shows comparisons of cycle efficiencies for the membrane-based reactors of the present invention compared to prior art reactors.

The microchannel membrane-based reactor is compared to other types of reactors, including plate heat exchanger reactors, horizontal falling-film reactors, and vertical falling-film reactors. FIG. 9 compares the absorption/desorption rate, while FIG. 10 compares the coefficient of performance. These FIGS. demonstrate that the microchannel membrane-based thermochemical energy storage systems of the present invention can outperform existing thermochemical energy storage systems while being more compact, more efficient, and having lower charging temperature.

The foregoing description of the present invention has been provided for the purposes of illustration and description. It is not intended to be exhaustive or to limit the invention to the precise forms disclosed. Many modifications and variations will be apparent to the practitioner skilled in the art.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A thermochemical energy storage system comprising:
a membrane-based thermochemical reactor including:

a solution channel having an absorbent-containing solution flowing therethrough;

a refrigerant channel having a refrigerant flowing therethrough;

a first fluid channel having a thermal transfer fluid flowing therethrough;

a second fluid channel having a heat source/heat sink fluid flowing therethrough;

a porous membrane positioned between the refrigerant channel and the solution channel, the porous membrane permitting flow of vapor molecules therethrough while restricting flow of absorbent molecules;

wherein the first fluid channel is positioned next to the refrigerant channel, separated by a channel wall, and the second fluid channel is positioned next to the solution channel;

a solution storage repository for storing the absorbent-containing solution in fluid communication with the solution channel; and a refrigerant repository for storing the refrigerant in fluid communication with the refrigerant channel.

2. The thermochemical energy storage system of claim 1, further comprising a refrigerant pump and a solution pump.

3. The thermochemical energy storage system of claim 1, wherein the absorbent-containing solution includes one or more of an ionic liquid, hydroxide, water, inorganic absorbent or organic absorbent.

4. The thermochemical energy storage system of claim 1, wherein the heat source/heat sink fluid is selected from one or more of water, conduction oil, or antifreeze.

5. The thermochemical energy storage system of claim 1, wherein the porous membrane has a pore diameter in a range from 0.2 to 6 microns with a thickness in a range from 20 to 175 microns and a porosity of 0.4 to 0.85.

6. The thermochemical energy storage system of claim 1, wherein the refrigerant is selected from one or more of $H_2O$, $NH_3$, alcohol, hydrofluorocarbon (HFC), hydrofluoroolefin (HFO), or $CO_2$.

7. A thermochemical energy storage system comprising:
a membrane-based thermochemical reactor including:
a solution channel having an absorbent-containing solution flowing therethrough;

a refrigerant channel having a refrigerant flowing therethrough;

a vapor channel positioned between the solution channel and the refrigerant channel;

a first fluid channel having a heat source/heat sink fluid flowing therethrough;

a second fluid channel having a heat source/heat sink transfer fluid flowing therethrough;

a first porous membrane positioned between the refrigerant channel and the vapor channel;

a second porous membrane positioned between the vapor channel and the solution channel; the porous membrane permitting flow of vapor molecules therethrough while restricting flow of absorbent molecules;

wherein the first fluid channel is positioned next to the refrigerant channel and the second fluid channel is positioned next to the solution channel;

a solution storage repository for storing the absorbent-containing solution in fluid communication with the solution channel; and a refrigerant repository for storing the refrigerant in fluid communication with the refrigerant channel.

8. The thermochemical energy storage system of claim 7, further comprising a refrigerant pump and a solution pump.

9. The thermochemical energy storage system of claim 7, wherein the first and second porous membranes have a pore diameter in a range from 0.2 to 6 microns with a thickness in a range from 20 to 175 microns and a porosity of 0.4 to 0.85.

10. The thermochemical energy storage system of claim 7, wherein the absorbent-containing solution includes one or more of an ionic liquid, hydroxide, water, inorganic absorbent or organic absorbent.

11. The thermochemical energy storage system of claim 7, wherein the heat source/heat sink fluid is selected from one or more of water, conduction oil, or antifreeze.

12. The thermochemical energy storage system of claim 7, wherein the refrigerant is selected from one or more of $H_2O$, $NH_3$, alcohol, hydrofluorocarbon (HFC), hydrofluoroolefin (HFO), or $CO_2$.

13. The thermochemical energy storage system of claim 7, further comprising a first wall next to the first fluid channel to restrict mass transfer, and where in the vapor channel is bounded by the first and second porous membranes, the first and second porous membranes being supported by first and second hollow support plates, and a second wall positioned between the solution channel and the second fluid channel.

14. A thermochemical energy storage system comprising:
a membrane-based thermochemical reactor including:
a first fluid channel having a thermal transfer fluid flowing therethrough;

a first wall next to the first fluid channel to restrict mass transfer;

a refrigerant channel having a refrigerant flowing therethrough;

a first porous membrane positioned next to the refrigerant channel, the porous membrane permitting flow of vapor molecules therethrough while restricting flow of absorbent molecules;

a first hollow support plate attached to the first porous membrane;

a vapor channel positioned next to the first hollow support plate;

a second hollow support plate positioned next to the vapor channel;

a second porous membrane attached to the second hollow support plate;

a solution channel having an absorbent-containing solution flowing therethrough;

a second wall next to the solution channel to restrict mass transfer;

a second fluid channel having a heat source/heat sink fluid flowing therethrough;

a solution storage repository for storing the absorbent-containing solution in fluid communication with the solution channel; and a refrigerant repository for storing the refrigerant in fluid communication with the refrigerant channel.

* * * * *